Patented Feb. 3, 1942

2,272,152

UNITED STATES PATENT OFFICE 2,272,152

LACQUER EMULSION

Malcolm C. Moore, Wilmington, Del., assignor to Hercules Powder Company, Wilmington, Del., a corporation of Delaware No Drawing. Application February 2, 1940, Serial No. 317,024

5 Claims. (Cl. 106—170)

This invention relates to an improvement in emulsions, more particularly to emulsions including a solution of nitrocellulose. Still more particularly this invention relates to emulsions of the oil-in-water type in which a solution of nitrocellulose, substantially immiscible in water, is emulsified in disperse phase in water.

Heretofore emulsions including a solution of nitrocellulose have been known and such emulsions, especially where the solution of nitrocellulose is dispersed in the internal phase, in, for example, water as the external phase, have been adapted for use in the formation of films and protective or decorative coatings on surfaces.

Such emulsions have, however, been open to certain objections. Thus, for example, films and coatings formed from such emulsions are relatively lacking in gloss as compared with films and coatings formed with the use of the same solution without emulsification. Furthermore, such emulsions have a greater tendency to blush on drying under conditions of high humidity than the same solution unemulsified.

Now, in accordance with this invention there are provided emulsions, involving a solution of nitrocellulose in disperse phase in water, which will give films and protective coatings of greatly increased gloss over that obtained with the use of nitrocellulose emulsions heretofore, and comparable to that of films and protective coatings obtained with the use of nitrocellulose solutions without emulsification. Further, the emulsions in accordance with this invention are capable of drying to films and protective coatings under conditions of higher humidity than the emulsions heretofore made with comparable solvent mixtures. The emulsions in accordance with this invention will also be advantageous from the standpoint of being proof against freezing at temperatures below the normal freezing point of water and, hence, against breaking as the result of exposure to such temperatures.

The emulsions contemplated by this invention will comprise essentially a solution of nitrocellulose in a solvent or solvent mixture which is substantially immiscible with water, emulsified in disperse phase in water containing a solvent for the nitrocellulose which has a solubility in water of at least 10% by weight.

The nitrocellulose solvent used may be any organic material, either solid or liquid at normal temperature characterized by solubility of at least 10% by weight in water and by solvent action for the nitrocellulose dissolved in the internal phase. The organic material having the essential characteristics indicated will be further characterized by the fact that it has an evaporation rate such that it will volatilize in the drying of the emulsion along with the water and the volatile ingredients of the nitrocellulose solution or, alternately, that it is water-miscible and is sufficiently non-volatile to remain permanently in the nitrocellulose film.

Where the nitrocellulose solvent which I add to the aqueous phase of the emulsion is of such character as to volatilize off with the water and the volatile ingredients of the nitrocellulose solution, it will be characterized by having an evaporation rate preferably higher than and, in any event, not substantially below that of butyl lactate. Whether the evaporation rate of a volatile solvent is higher than that of butyl lactate may readily be determined, as for example, by reference to the article by Doolittle, Ind. & Eng. Chem., volume 27, pages 1169 to 1179, October, 1935. This article not only gives the evaporation rates of many solvents but also sets forth a reliable method of determining the evaporation rate of any solvent. Where the nitrocellulose solvent which I add to the aqueous phase of the emulsion is such as to be volatilized off in the drying of the film, it will have little or no plasticizing action on the film. It will, however, have a distinct effect on the properties of the film, such as gloss, blush, etc., and such other properties as are generally controlled by the conditions of drying.

Where the solvent is of such character as to remain in the ultimate film, it will tend to act as a plasticizer. Consequently, the amount of conventional plasticizer added to the emulsified nitrocellulose solution may be reduced to compensate for the plasticizing action of the solvent deposited by the aqueous solution. When such a solvent is used in order to take advantage of its plasticizing action, I prefer to employ it in amounts which are within the lower portion of the range of 15 to 40%.

While I contemplate using any nitrocellulose solvent which has the desired characteristics as defined in this specification and therefore do not wish to be limited to the illustrative examples hereinafter given, the following examples are of solvents which may be used in the aqueous phase of a nitrocellulose emulsion in accordance with my invention: methyl acetate, acetone, methyl ethyl ketone, diethylene oxide (dioxane), ethyl lactate, ethylene glycol monoethyl ether, ethylene glycol monobutyl ether, diethylene glycol monoethyl ether, diethylene glycol monobutyl ether, thiodiglycol acetate, diacetin, etc. These and other nitrocellulose solvents possessed of similar characteristics may be used either alone or in mixtures of two or more solvents within the contemplation of my invention.

Of the above solvents, diethylene glycol monoethyl ether, diethylene glycol monobutyl ether, thiodiglycol acetate and diacetin are of a character such that they will remain in the ultimate film, while the other liquids mentioned are of such character that they will volatilize off with the water and volatile ingredients of the nitrocellulose solution during the drying operation. These liquids which remain in the ultimate film will act as plasticizers in the film and will, of course, be compatible therewith.

The nitrocellulose used in my emulsions may be characterized by having a nitrogen content within a range such that it is soluble in water-immiscible organic solvents. The viscosity type and other characteristics of the nitrocellulose will be dictated by the requirements of the ultimate use for which the emulsion is intended. Further, the nitrocellulose solution may include any of the usual solvents, diluents, or solvent mixtures generally used in lacquers or enamels, or desired to be used, depending upon the ultimate use for which the emulsion is intended, so long as the solution is sufficiently immiscible with water so that its emulsification with water may be effected. Thus, for example, solvents such as butyl acetate, butyl propionate, amyl acetate, butyl butyrate, butyl lactate, amyl propionate, amyl butyrate, secondary hexyl acetate, octyl acetate, methyl cyclohexanone, methyl n-amyl ketone, di-iso-propyl ketone, methyl iso-butyl ketone, methyl n-butyl ketone, cyclohexanol acetate, fenchone, etc., may be used, while xylol, high flash solvent naphtha, petroleum naphtha, toluol, amyl alcohol, butyl alcohol, etc. may be used as diluents.

This viscosity of the solution may likewise be as desired. In addition to nitrocellulose and a suitable solvent or solvent mixture, the nitrocellulose solution may contain any of the usual ingredients of lacquers and enamels, as a plasticizer, such as, for example, tricresyl phosphate, triphenyl phosphate, dibutyl phthalate, etc., a gum or resin, such as, for example, dammar gum, ester gum, terpinene-maleic anhydride resin, glyptal type resins, etc., pigments, dyes etc. which are generally or which may be desired to be included in order to give required or desired characteristics to the film, coating, or the like, to be ultimately formed through use of the emulsion. The plasticizer, and gum or resin will be of a type which is substantially insoluble in water, and the pigment or dye used will desirably be substantially free of electrolytes.

The emulsion in accordance with this invention may, and preferably will, contain an emulsifying agent. The emulsifying agent may be of any type and characteristic suitable for the purpose but will preferably, for example, be a soap, such as sodium oleate, or the like, sulphonated castor oil, sodium lauryl sulfate, sodium oleyl sulfate, sodium myristyl sulfate, the sodium salt of butyl or isopropyl naphthalene sulfonic acid, oleo glyceryl sulfate, methyl cellulose, sodium salt of sulfuric ester of glycerin mono-dodecyl ether, the sodium salt of dodecylmercapto acetic acid, etc. The emulsifying agent will be used in varying amount depending upon the particular agent, and will preferably be a small amount not greatly exceeding 2% by weight of the aqueous phase.

The emulsion in accordance with this invention will ordinarily contain a proportion of nitrocellulose solution to the aqueous phase within the ratio of 2:1 to 4:1 by weight, and desirably within the ratio of 2:1 to 3:1 by weight.

A nitrocellulose solvent having the characteristics indicated may be included in the aqueous phase of emulsions in accordance with this invention in quantity within a range of from about 15% to about 40%. The amount of organic liquid added to the aqueous phase of any given emulsion will be dictated primarily by the behavior of the emulsion without such addition, when dried under the conditions of humidity under which it will ultimately be used. Thus, if the original emulsion is of a formulation such that it dries to a film which is badly blushed, the organic liquid will be added to the aqueous phase in relatively large proportions. If, on the other hand, the formulation is such that it dries to a reasonably good film which, however, is deficient in gloss, the nitrocellulose solvent need be added only in proportions in the lower part of the range of 15% to 40% to correct this deficiency.

In the case of emulsions intended for shipment and storage at temperatures below the normal freezing point of water, it may be desirable to add more of the nitrocellulose solvent to the aqueous phase than would be required to produce the desired improvement in the appearance of the film. The amount which is added will depend upon the temperature to which the emulsion will be subjected and the amount of the particular organic liquids to be added to prevent freezing at a given temperature can be readily calculated by well known methods. The amount of the nitrocellulose solvent, in excess of that which would otherwise be added to produce the desired improvement in the appearance of the film, has no appreciable deleterious effect on the appearance of the film.

The amount of nitrocellulose solvent added to the aqueous phase will be not substantially in excess of its solubility in water and may be added in amount within the range of about 15% to 40% by weight of the aqueous phase (and depending upon the solubility characteristics of the added material). To obtain the optimum results of my invention, the amount added will be within the range of about 15% to about 30% by weight of the aqueous phase of the emulsion.

In the production of emulsions in accordance with this invention, the nitrocellulose solvent will be added to and incorporated with the water, as will also the emulsifying agent, if one be used, before emulsification of the nitrocellulose solution therewith. Preferably, the nitrocellulose solvent and emulsifying agent, if used, will be dissolved in the water, and the nitrocellulose solution then added with agitation to effect preliminary emulsification and finally the preliminary emulsion will be homogenized in any suitable manner, as, for example, by passing it through a colloid mill or homogenizer of well known types.

By way of illustration of this invention the following examples may be cited:

Example I

A nitrocellulose solution having the following composition was prepared:

| | Per cent by weight |
|---|---|
| Nitrocellulose (5 sec. wet with butyl alcohol) | 28.6 |
| Tricresyl phosphate | 12.0 |
| Butyl acetate | 29.7 |
| Toluol | 29.7 |
| | 100.0 |

Two and one-half parts of this solution were emulsified with one part of each of the following aqueous solutions to produce an oil-in-water type emulsion by treatment in a colloid mill:

|  | A | B | C | D |
|---|---|---|---|---|
|  | Percent | Percent | Percent | Percent |
| Sodium lauryl sulfate | 0.5 | 0.5 | 0.5 | 0.5 |
| Sulfonated castor oil | 1.0 | 1.0 | 1.0 | 1.0 |
| Organic liquid |  | 10.0 | 20.0 | 30.0 |
| Water | 98.5 | 88.5 | 78.5 | 68.5 |
|  | 100.0 | 100.0 | 100.0 | 100.0 |

The following organic liquids were used in the above aqueous solutions B, C and D in the amounts indicated:

Methyl acetate
Acetone
Methyl ethyl ketone
Diethylene oxide (dioxane)
Ethyl lactate
Ethylene glycol monoethyl ether
Diethylene glycol monoethyl ether
Diacetin When the emulsion prepared with the aqueous solution containing no nitrocellulose solvent was dried to a film on a glass plate at a relative humidity of 40–45%, the resulting films had a distinct hazy blush and were very rough due to blush spots, so that they were totally unsatisfactory as protective and decorative coatings. In comparison, the emulsions prepared with the aqueous solution containing the various nitrocellulose solvents, dried to distinctly better films. The emulsions which contained 30% of nitrocellulose solvent in the aqueous phase dried to films showing no blush whatever. The emulsions which contained 20% by weight of dioxane, ethyl lactate, ethylene glycol monoethyl ether diacetin, and diethylene glycol monoethyl ether, respectively, dried to films which were entirely free of any blush or haziness and were entirely satisfactory for use as protective and decorative coatings. The films for emulsions which contained 20% of the remaining nitrocellulose solvent listed above, showed a slight haze, while all of the emulsions containing as little as 10% nitrocellulose solvent in the aqueous phase showed a slight haze. In every case the general appearance of the film, aside from the haze or blushing was materially improved by the use of the organic liquid.

In the above example it will be appreciated that the addition of a nitrocellulose solvent to the aqueous phase of nitrocellulose emulsion which was worthless for the production of protective and decorative coatings, at forty per cent relative humidity, made them suitable for such purposes.

When the above series of emulsions were applied to water absorbent and porous surfaces such as paper and wood the same distinct improvements in film appearance were obtained. In application to such surfaces, however, a smaller amount of organic solvent in the water phase is required to accomplish the desired results due to the absorption of some of the water by the surface being coated. Similarly, lower amounts of organic solvent are required in the water phase when the emulsion coating is dried at an elevated temperature.

*Example II*

A nitrocellulose solution of the following composition was prepared:

| | Per cent by weight |
|---|---|
| Nitrocellulose (5 sec. type wet with butyl alcohol) | 28.6 |
| Tricresyl phosphate | 12.0 |
| Terpinene-maleic anhydride resin | 4.0 |
| Sec. hexyl acetate | 14.0 |
| Butyl acetate | 14.0 |
| Toluol | 27.4 |

The above nitrocellulose solution was made into a series of emulsions duplicating those described in Example I, except for the difference in the compositions of the nitrocellulose solution. Thus, two and one-half parts of the above solution were emulsified with one part of each of a series of aqueous solutions of the compositions described in Example I.

When dried to films under 50% relative humidity this series gave practically identical results with the series described in Example I and in every case the presence of the organic liquid in the aqueous phase made a distinct improvement in the appearance of the film.

It will be appreciated that the boiling range of the solvents used in the dispersed nitrocellulose solution as well as the relative humidity at which the film is dried will be an influencing factor in regard to the amount of organic solvent necessary to be added to the aqueous phase to obtain the desired clear and smooth film. With high boiling solvents such as octyl acetate films free of blush can be obtained at relatively low humidities without the use of organic solvents in the aqueous phase. These, however, are characterized by slow drying as compared with films of equal appearance laid down by the examples, containing organic solvent in the aqueous phase, given above. Even with these high boiling solvent mixtures an increased gloss can be realized by small additions of organic solvent to the aqueous solution.

It will also be fully appreciated that the addition of a nitrocellulose solvent to the aqueous phase of any nitrocellulose emulsion will improve the appearance of the film produced, and this is true even in the case of the best nitrocellulose emulsions.

By way of illustration of the effect of the addition of a nitrocellulose solvent to the aqueous phase of a nitrocellulose on the freezing of the emulsion, for example, 15% of acetone contained in the aqueous external phase, in accordance with this invention, will protect the emulsion from freezing at temperatures as low as about 23° F. Again 30% acetone contained in the aqueous phase will protect the emulsion against freezing at temperatures as low as about +9° F. As has been indicated, if a nitrocellulose solvent of different molecular weight from that of acetone is used, the amount of organic liquid necessary to protect the emulsion at any given temperature will differ from that required when acetone is used.

Emulsions in accordance with this invention may include nitrocellulose solutions made up on any well known or desired formula, such as are productive of, for example, lacquers, enamels, and the like, as long as the solution is substantially immiscible with water. The emulsions may be of any desired viscosity within wide limits, and may be adaptable for application to surfaces by spraying, brushing, or the like.

It will be understood that it is not intended that this invention shall be limited in scope by the above description, since it is contemplated that various modifications in details may be made without departing from the scope of the invention, which in essence involves an emulsion including a substantially water-immiscible nitrocellulose solution and water containing from about 15% to about 40% of an organic material characterized by a solubility of at least 10% by weight in water and by solvent action for the nitrocellulose contained in the water-immiscible solution.

This application is a continuation-in-part of my application for United States Patent Serial No. 754,862, filed November 26, 1934, and Serial No. 127,294, filed February 23, 1937.

I claim:

1. A stable emulsion comprising a substantially water-immiscible solution of nitrocellulose dispersed in internal phase in water, in which the aqueous phase contains in solution in the water about 30% by weight of an organic material which is a solvent for nitrocellulose, the nitrocellulose solution having a weight ratio to the aqueous phase between about 2 : 1 and about 4 : 1, the emulsion being capable of forming unblushed films and protective coatings of improved smoothness upon drying at a relative humidity of 40-45% and being improved in resistance to breaking at temperatures below the freezing point of water.

2. A stable emulsion comprising a substantially water-immiscible lacquer solution comprising nitrocellulose, plasticizer, and resin dispersed in internal phase in water containing an emulsifying agent, in which the aqueous phase contains in solution in the water about 30% by weight of an organic material which is a solvent for nitrocellulose, the nitrocellulose solution having a weight ratio to the aqueous phase between about 2 : 1 and about 4 : 1, the emulsion being capable of forming unblushed films and protective coatings of improved smoothness upon drying at a relative humidity of 40-45% and being improved in resistance to breaking at temperatures below the freezing point of water.

3. An emulsion as defined in claim 1 in which the organic material is the monoethyl ether of ethylene glycol.

4. An emulsion as defined in claim 1 in which the organic material is the monoethyl ether of diethylene glycol.

5. An emulsion as defined in claim 1 in which the organic material is acetone.

MALCOLM C. MOORE